April 14, 1931.    J. C. MARTIN, JR    1,800,552
VALVE AND PACKING
Filed June 16, 1926    2 Sheets-Sheet 1
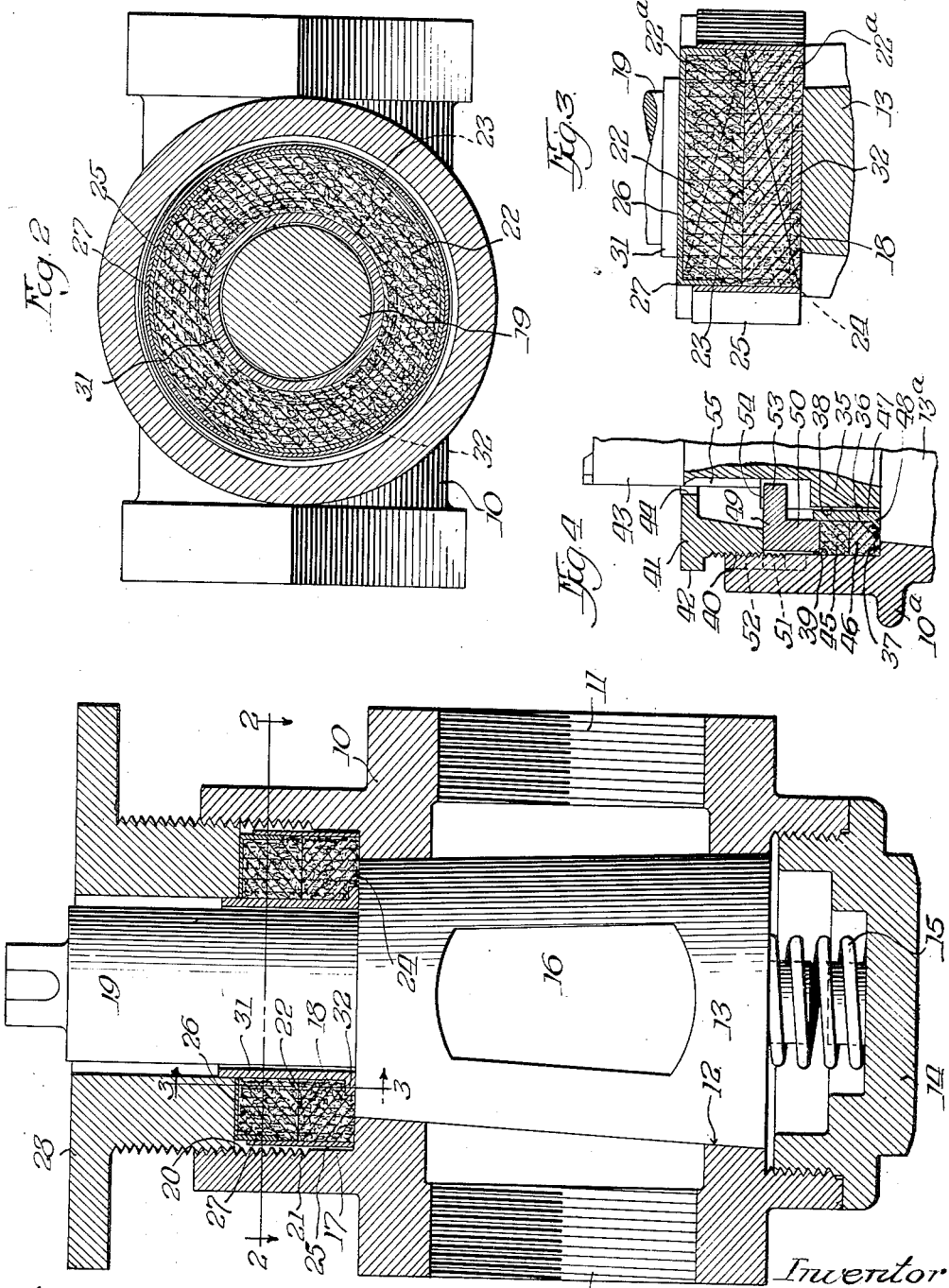

April 14, 1931. J. C. MARTIN, JR 1,800,552
VALVE AND PACKING
Filed June 16, 1926 2 Sheets-Sheet 2

Patented Apr. 14, 1931

1,800,552

UNITED STATES PATENT OFFICE

JESSE C. MARTIN, JR., OF SAN FRANCISCO, CALIFORNIA

VALVE AND PACKING

Application filed June 16, 1926. Serial No. 116,263.

This invention relates broadly to packing elements, and more particularly to new and useful improvements in packings for valves, and specifically to an improved packing characterized by the embodiment therein of means for reducing friction between the parts affected and for facilitating adjustment of the packing.

While, for the sake of convenience, the packing of this invention is described and shown as embodied in a valve of the rotary plug type, it will be understood that the invention is capable of adaptation to other analogous devices, and therefore, finds a wide field of utility.

The principal objects and advantages which characterize this invention reside in the provision of an improved packing and gland construction; the provision of an improved packing for relatively movable elements, such as the body and seat of a rotary plug valve; the provision of an improved packing means and improved adjusting means therefor; the provision of an improved packing and means for reducing friction between the packing and the elements affected thereby; the provision of an improved packing element and means for facilitating relative movement of the elements affected thereby; the provision of an improved packing element and improved means for reducing strains on the packing element; the provision of an improved packing element and means constructed and arranged to serve for retarding the movement of the packing element in response to action by a gland member; the provision of an improved packing having a casing for limiting the contact of the packing with the elements affected to a predetermined area for facilitating relative movement of the parts; the provision of an improved packing element and means for facilitating adjustment and replacement of the packing element; the provision, in combination with an improved packing element, of an improved follower construction; the provision of an improved packing element and the association therewith of an improved housing for the packing of a dissimilar material from that of the packing; and the provision, in a valve structure, of an improved packing element and retaining and adjusting means therefor which facilitates operation of the valve itself by reducing to a practical minimum the area of contact between the valve member and the packing and by interposing means for preventing undue friction between the packing and the body for facilitating adjustment of the packing proper.

This invention finds special utility when employed in rotary plug valves and further objects and advantages reside in the provision of a packing and housing therefor which is heat resistant and is of such construction that frequent adjustment of the packing element may be had without material damage to the packing element or to the parts affected thereby.

My co-pending application Ser. No. 116,261, plug valves, filed June 16, 1926, contains claims generic to the species claimed herein and also to the species claimed in that application.

The foregoing and such other objects and advantages as may appear or be pointed out as this description proceeds are attained in one structural embodiment of the invention, illustrated in the accompanying drawings in which:

Figure 1 is a vertical sectional view, partly in elevation, illustrating a valve including the improved packing.

Figure 2 is a sectional view taken on the line 2—2 of Figure 1 looking in the direction indicated by the arrows.

Figure 3 is a sectional view taken on the line 3—3 of Figure 1 looking in the direction indicated by the arrows.

Figure 4 is a fragmentary sectional view of an alternative form of the invention.

Figure 5:
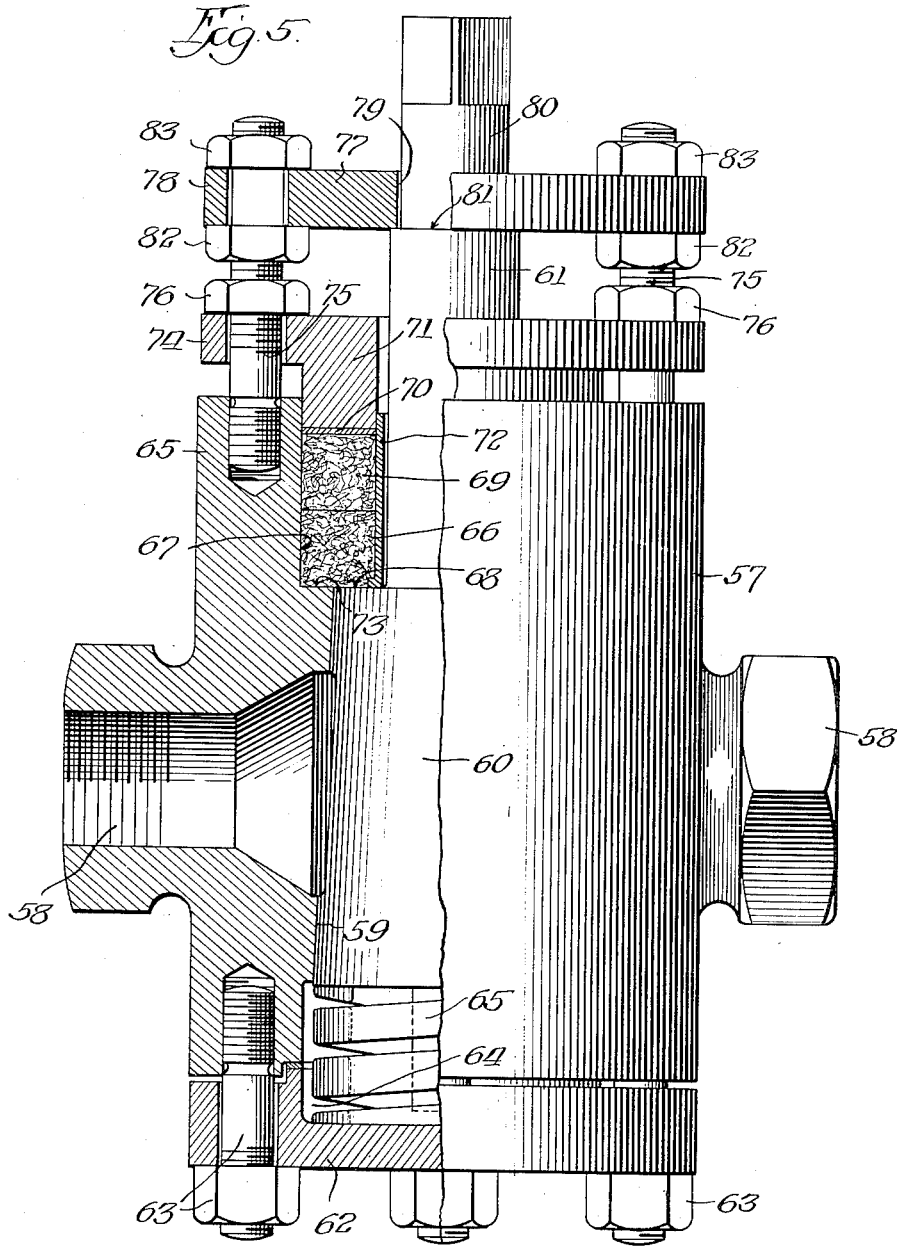
Figure 5 is a vertical sectional view of an alternative form of my invention.

Referring now more particularly to the drawing, it will be observed that a valve body 10 is provided having transverse passageways 11, 11 and a central tapering bore 12 in which is received a valve plug 13. The bottom of the bore 12 is open and a closure member 14 is inserted in said opening, a helical spring 15 being interposed between the closure 14 and the valve plug for maintaining the latter upon its seat, formed by the bore 12. The valve plug is provided with a transverse passageway 16 which is adapted to be brought into register with the passageways 11 for controlling the flow of fluid therethrough.

It will be observed from Figure 1 that the upper end of the body 10 is provided with an annular shoulder 17 which is adapted to be substantially on the same plane with an annular shoulder 18 formed on the valve member 13. Said shoulder 18 is formed by reducing the valve to form a valve stem 19 which projects from the upper part of the body through an opening therein provided with internal threads 20. The threads 20 terminate short of the bottom of the opening, as indicated at 21, to form a smooth uninterrupted surface adjacent to the shoulder 17.

In order to prevent leakage past the valve seat and valve members adjacent to the shoulders 17 and 18, there is provided a packing element generally designated 22 seating upon said shoulders and preferably formed of a non-metallic substance including two or more shaped split rings, 22a, 22a, the rings being cut diagonally as indicated at 23, and the adjacent ends secured together by a stitching 24, the split portions overlapping solid portions of the adjacent ring, which prevents leakage, and which prevents fraying of the material forming the packing which, in the present instance, is preferably asbestos.

In order to reduce strains on the packing and to prevent the latter from engaging the screw threads 20, and thus rendering difficult the adjustment of the packing by damaging the same and rendering difficult removal of the packing, I provide an improved housing which includes a cylindrical wall 25 interposed between the threads 20 and the adjacent surface of the packing, a follower member 26 being movable relatively to the wall 25 and having a flange 27 disposed within the confines of said wall. The follower 26 rests upon the upper end of the packing, as shown in Figure 1.

A gland member 28 is provided having a threaded portion 29 on the extension 30, said extension abutting the follower 26 and serving to cause said follower to bear upon the packing.

It will thus be seen that the housing formed by the elements 25 and 26 prevents undue friction between the gland and the packing and the body and seat packing so that adjustment of the packing to take up for wear is facilitated. This is particularly advantageous in valves where high pressures and temperatures are present which necessitate frequent taking up on the packing.

In order to facilitate movement of the valve in use by preventing undue friction between the valve and the packing, there is provided a cylindrical sleeve member 31 surrounding the valve stem 19 and lying between the latter and said packing and gland. The sleeve 31 is provided at its inner end with an annular flange 32 engaged between the packing so as to prevent the sleeve from becoming displaced outwardly. The sleeve 31 seats on the shoulder 18 formed on the valve, and the surface of the sleeve is adapted to engage the inner surfaces of the packing element and the gland member 30.

From the foregoing it will be observed that the sleeve 31 forms a means interposed between the packing element and a portion of the valve to facilitate movement of the valve, and that the members 25 and 26 serve to prevent damage to the packing on the threads 20 and also remove the difficulty usually encountered in replacing a packing of this nature. Furthermore, it will be observed that the members 25 and 26 and the sleeve 31 cooperate to concentrate the packing at the point where it is most needed, that is, the junction between the shoulders 17 and 18. This arrangement not only increases the life of the packing in that only that portion of the packing necessary to perform the function is exposed to the high temperature, but the arrangement also insures that the packing will be evenly compressed by the gland and will not become frayed or otherwise damaged by contact with the threads 20.

Referring now more particularly to the form of the device shown in Figure 4, the valve body is shown in part at 10a and the valve member at 13a. In this instance the valve member is reduced in diameter as at 35 to form an annular shoulder 36 and similarly the body 10 is formed with a complemental shoulder 37. The valve body and valve member thus form a chamber defined by the walls 38 and 39 for receiving the packing and sleeve member to be described.

The inner annular wall 39 of the body 10 extends outwardly and at 40 is internally threaded to receive the externally threaded portion 41 of the gland member 42.

The valve member 13a is further reduced to afford a valve stem 43 which extends through an opening 44 in the gland 42.

The packing in the present instance, as previously described, comprises a pair of annular members 45 and 46 arranged and constructed in the same manner as the packing shown in Figures 1–3, said packing members 45 and 46 being received against wall 39 between said wall and the wall 38, and resting upon the shoulders 36 and 37. In order to eliminate friction between the valve stem and the packing, a sleeve 47 is deposited between said packing and the valve stem and is provided with an annular flange 48 engaged beneath the packing which prevents said sleeve from moving outwardly.

Between the member 41 and the gland 42 I provide a follower member 49 which is provided with a portion 50 engaging the top surface of the packing. The follower member is provided with a lateral lug 51 which engages in a gateway or groove 52 in the wall 39 which prevents rotation of the follower but permits its displacement longitudinally of the valve. Oppositely to the lug 51 there is provided a stop member 53 which engages in an arcuate recess 54 formed in the valve, the follower thus forming combined means for compressing the packing and as means for limiting the movement of the valve. In order to facilitate assembly of the valve, packing, etc., the valve stem is provided with a longitudinal groove 55 which accommodates the stop member during such assembly.

Referring now in detail to Figure 5, I provide a valve body 57 having the walls thereof provided with fluid passageways 58 and having a valve seat 59. In the present instance the valve seat is generally tapering and a generally tapering plug member 60 engages said seat. The plug member 60 is provided with a valve stem 61 which projects from the upper open end of the body 57. The opposite end of the body is open but provided with a closure 62 secured in position by the provision of nuts and bolts 63, the closure having a recess 64 for the reception of a helical spring 65 interposed between said closure and the bottom of the valve 60 for maintaining the latter on its seat.

The upper end of the body 57 is formed with an annular wall 65 internally bored to form a smooth surface 66 terminating at its inner end in an annular shoulder 67. The valve stem 60 being smaller in diameter than the upper end of the valve 60, a shoulder 68 is afforded which is in a plane substantially coincidental with the shoulder 67.

I provide a suitable packing which may be formed of a series of split rings indicated at 69 and on top of this packing there is placed an annulus 70 against which a gland member 71 presses. To prevent expansion of the packing against the valve stem and to thereby relieve friction at this point, I provide a sleeve 72 placed from the valve stem and resting upon the shoulder 68. Retraction of the sleeve is prevented by the provision of an annular shoulder 73 on said sleeve which engages beneath the packing. The gland 71 is provided with an annular flange 74 apertured to accommodate a series of stud bolts 75 provided with suitable nuts 76 for forcing said gland against the packing.

In order to permit of displacement of the valve longitudinally with respect to and away from its seat, I provide an extra plate 77 suitably apertured as at 78 to receive the said bolts and also apertured as at 79 to accommodate the reduced outer portion 80 of the valve stem 61. The reduced outer portion 80 forms, with the valve stem 61, a shoulder 81 against which the plate 77 abuts. Lock nuts 82 are provided on the said bolt 75 and actuating nuts 83 are also provided for moving the plate toward the body 57 and thus lifting the valve off its seat without disturbing the packing. Furthermore, adjustment of the packing may be had without disturbance of the adjustment of the auxiliary plate. It will thus be seen that in this form of the invention I have incorporated means for preventing undue friction between the packing and the valve tending to render difficult rotation of the valve, and have also provided means for lifting the valve off its seat independently of the packing or the adjusting means of said packing.

From the foregoing it will be observed that in both forms of the invention shown, substantially all of the thrust causing compression of the packing which results in friction causing retardation of the movement of the plug in its seat is transmitted against the end of the plug and the shoulders 17 or 37.

Having thus described my invention and illustrated its use, what I claim as new and desire to secure by Letters Patent is:

1. In a device of the character described, in combination with a body having a seat and a member movable relatively thereto, a packing device for said movable member comprising a packing element bearing on said body and member, a gland for compressing said packing element, and means interposed between said packing element and a portion of said movable member and spaced away from a portion of the latter to facilitate movement of said valve member, and a follower bearing on said packing element and having a flange portion whereby to reduce friction both between said gland and packing element and said body and said packing element.

2. In a device of the character described, in combination with a body having a seat, and a member movable relatively thereto, a packing device for said movable member comprising a compressible packing element having one end portion bearing on said body and member, a gland for compressing said packing element, and a compressible housing for the remaining portion of said packing element.

3. In a device of the character described, in combination with a body having a seat, and a member movable relatively thereto, a packing device for said movable member comprising a packing element bearing on said body and member, a gland for compressing said packing element, and a pair of friction reducing means interposed between said body and a portion of said movable member, and a follower bearing on said packing element, said packing element being interposed between the members of said pair.

4. In a device of the character described, in combination with a body having a seat, and a member movable relatively thereto, a packing device for said movable member comprising a packing element bearing on said body and member, a gland for compressing said packing element, and a pair of friction reducing means interposed between said body and a portion of said movable member, one of said last mentioned means having an extended portion, a follower arranged between the members of said pair, and said packing element being interposed between the members of said pair and between said follower and said extended portion.

5. In a device of the character described, in combination with a body having a seat, and a member movable relatively thereto, a packing device for said movable member comprising a packing element bearing on said body and member, a gland for compressing said packing element, and a pair of friction reducing means interposed between said body and a portion of said movable member, one of said last mentioned means having an extended portion, a flanged follower arranged between the members of said pair, to form a housing for said packing element, and said packing element being interposed between the members of said pair and between said follower and said extended portion.

6. In a valve, in combination, a body having a seat, a valve member relatively movable to said seat and provided with an extending portion lying in a threaded opening in said body, and a packing element bearing on said body and valve member, a gland for compressing said packing, and engaging the threads of said opening, and follower means for preventing contact of said packing with the wall of said opening.

In testimony whereof, I have hereunto signed my name.

JESSE C. MARTIN, Jr.